United States Patent [19]

Yu

[11] Patent Number: 5,348,369
[45] Date of Patent: Sep. 20, 1994

[54] SADDLE FOR A BICYCLE

[76] Inventor: Tsai-Yun Yu, No. 1012, Sec. 1, Chung-Shan Rd., Ta-Chia Chen, Taichung Hsien, Taiwan

[21] Appl. No.: 27,609

[22] Filed: Mar. 1, 1993

[51] Int. Cl.$^5$ ............................................. B62J 1/18
[52] U.S. Cl. .................................. 297/214; 297/195.1
[58] Field of Search .............. 297/202, 195, 458, 459, 297/214, 200

[56] References Cited

U.S. PATENT DOCUMENTS

| | | | |
|---|---|---|---|
| 532,444 | 1/1895 | Christy | 297/202 |
| 594,316 | 11/1897 | Basch | 297/214 |
| 602,732 | 4/1898 | Craig | 297/202 X |
| 605,051 | 5/1898 | Christy | 297/202 |
| 620,946 | 3/1899 | Meisselbach | 297/214 X |
| 645,256 | 3/1900 | Garford | 297/202 |
| 1,975,405 | 10/1934 | Pryale | 297/195 |
| 2,341,720 | 2/1944 | Kalter | 297/214 |
| 4,132,228 | 1/1979 | Green | 297/459 X |
| 5,163,737 | 11/1992 | Navach et al. | 297/459 |

FOREIGN PATENT DOCUMENTS 0066792 of 0000 Denmark ............................ 297/195
0426657 5/1935 United Kingdom ................ 297/195

Primary Examiner—Kenneth J. Dorner
Assistant Examiner—Milton Nelson, Jr.
Attorney, Agent, or Firm—Beveridge, DeGrandi, Weilacher & Young

[57] ABSTRACT

A saddle includes a saddle body, a foam, a covering, and two elastic bodies. The saddle body is made of a hard elastic material and is coated with the foam. The foam is coated with the covering. The saddle body has two accommodating holes formed therethrough and located at two positions in the saddle body under a portion of the covering, on which portion a user normally sits. The elastic bodies are made of a soft elastic material and are retained within the accommodating holes in such a manner that the top ends of the elastic bodies extend from the accommodating holes. Accordingly, the elastic bodies can absorb the shock of two portions of the foam, which two portions are located above the elastic bodies. The saddle body has two retaining units so that the elastic bodies can be retained on the saddle body.

3 Claims, 4 Drawing Sheets

SADDLE FOR A BICYCLE

BACKGROUND OF THE INVENTION

1. Field of the Invention

The invention relates to a saddle for a bicycle, more particularly to a saddle which has an improved shock absorbing effect.

2. Description of the Related Art

Referring to FIG. 1, a conventional saddle includes a saddle body (10), a foam (20), a covering (30) and two elastic bodies (40). The saddle body (10) is made of a hard elastic material and is coated with the foam (20). The elastic bodies (40) are made of a soft elastic material and are mounted securely on the foam (20) and are located at two positions in the foam (20) under a portion of the covering (30), on which portion a user normally sits. Normally, the foam (20) is made of a hard sponge, while the elastic bodies (40) are made of rubber.

Referring to FIG. 2, as the user sits on the saddle, the elastic bodies (40) are depressed to form concave upper surfaces (shown in phantom lines). Because the elastic bodies (40) are supported on the hard saddle body (10), shock is felt at the upper surface of the saddle, thereby causing discomfort when the saddle is in use.

SUMMARY OF THE INVENTION

The main object of this invention is to provide a saddle which has an improved shock absorbing effect.

According to this invention, a saddle includes a covering, a foam, a saddle body, and two elastic bodies. The saddle body is made of a hard elastic material and is coated with the foam. Two accommodating holes are formed through the saddle body and are located at two positions in the saddle body under a portion of the covering, on which portion a user normally sits. Two elastic bodies, which are made of a soft elastic material, are retained respectively within the accommodating holes and have top ends that extend from the accommodating holes. Accordingly, the elastic bodies can absorb the shock of two portions of the foam, which two portions are located above the elastic bodies. The saddle body has two retaining units so that the elastic bodies can be retained on the saddle body.

BRIEF DESCRIPTION OF THE DRAWING

Other features and advantages of this invention will become apparent from the following detailed description of the preferred embodiments of this invention, with reference to the accompanying drawings, in which.

DETAILED DESCRIPTION OF THE PREFERRED EMBODIMENT

Figure 3:
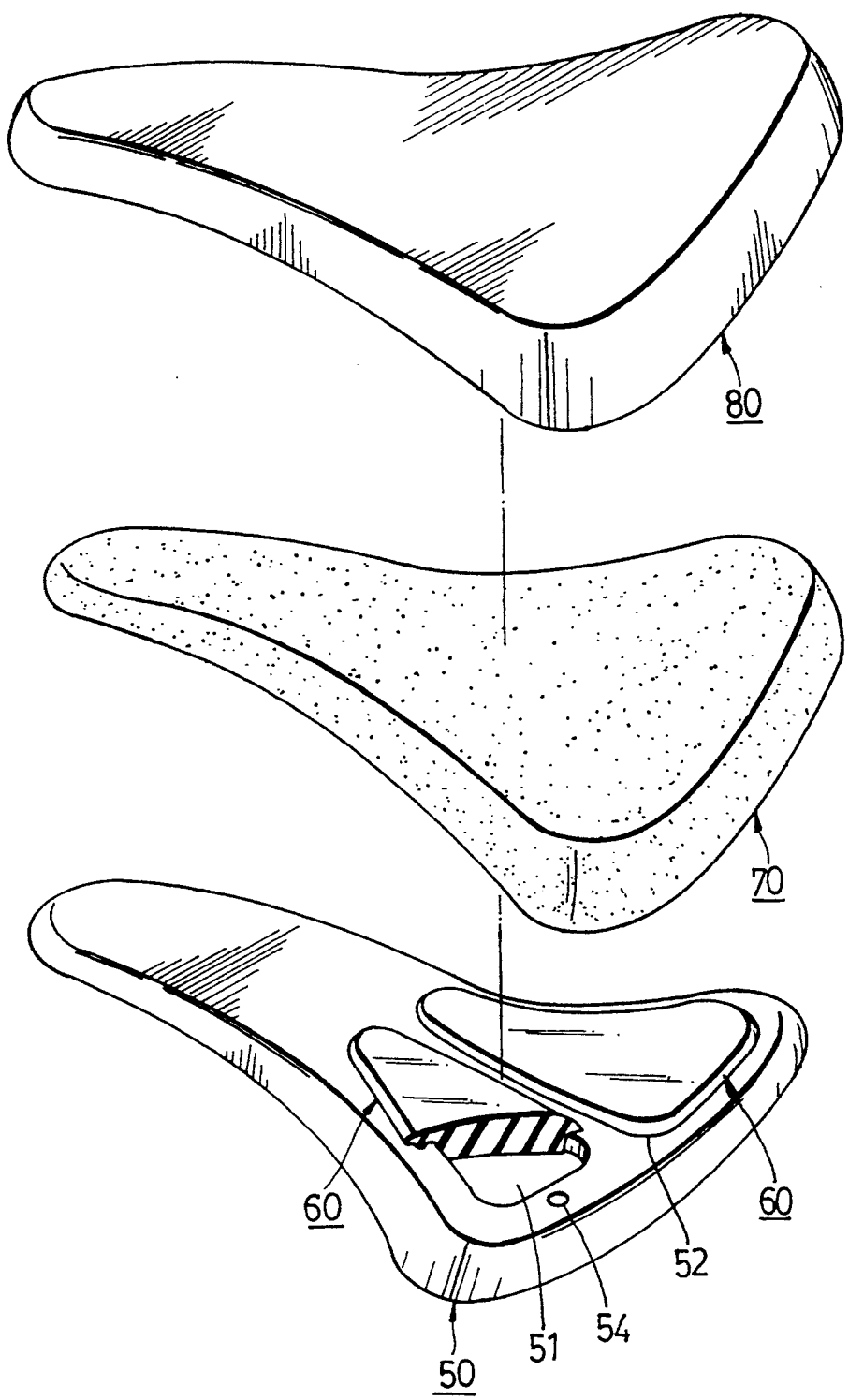
FIG. 3 is an exploded view showing the first embodiment of the saddle according to this invention.

Referring to FIG. 3, the saddle of the first embodiment of this invention includes a saddle body (50), two elastic bodies (60), a foam (70), and a covering (80). The saddle body (50) is made of a hard elastic material and is coated with the foam (70). The foam (70) is coated with the covering (80). Two accommodating holes (51, 52) are formed through the saddle body (50) and are located at two portions in the saddle body (50) under a portion of the covering (80), on which portion a user normally sits. The elastic bodies (60) are made of a soft elastic material and are retained respectively within the accommodating holes (51, 52) in such a manner that the top ends of the elastic bodies (60) extend from the accommodating holes (51, 52). The saddle body (50) has two retaining units. Each of the retaining units includes several fastening holes (54) formed through the saddle body (50) around a corresponding accommodating hole (51). Each of the elastic bodies (60) has an upper end portion with a flange (61) (see FIG. 4) projecting outward from the periphery thereof so as to extend over the upper surface of the saddle body (50), and several fastening strips (62) (see FIG. 4) extending downward from the flange (61) and through the respective fastening holes (54). As a result, the elastic bodies (60) are retained on the saddle body (50).

Figure 5:
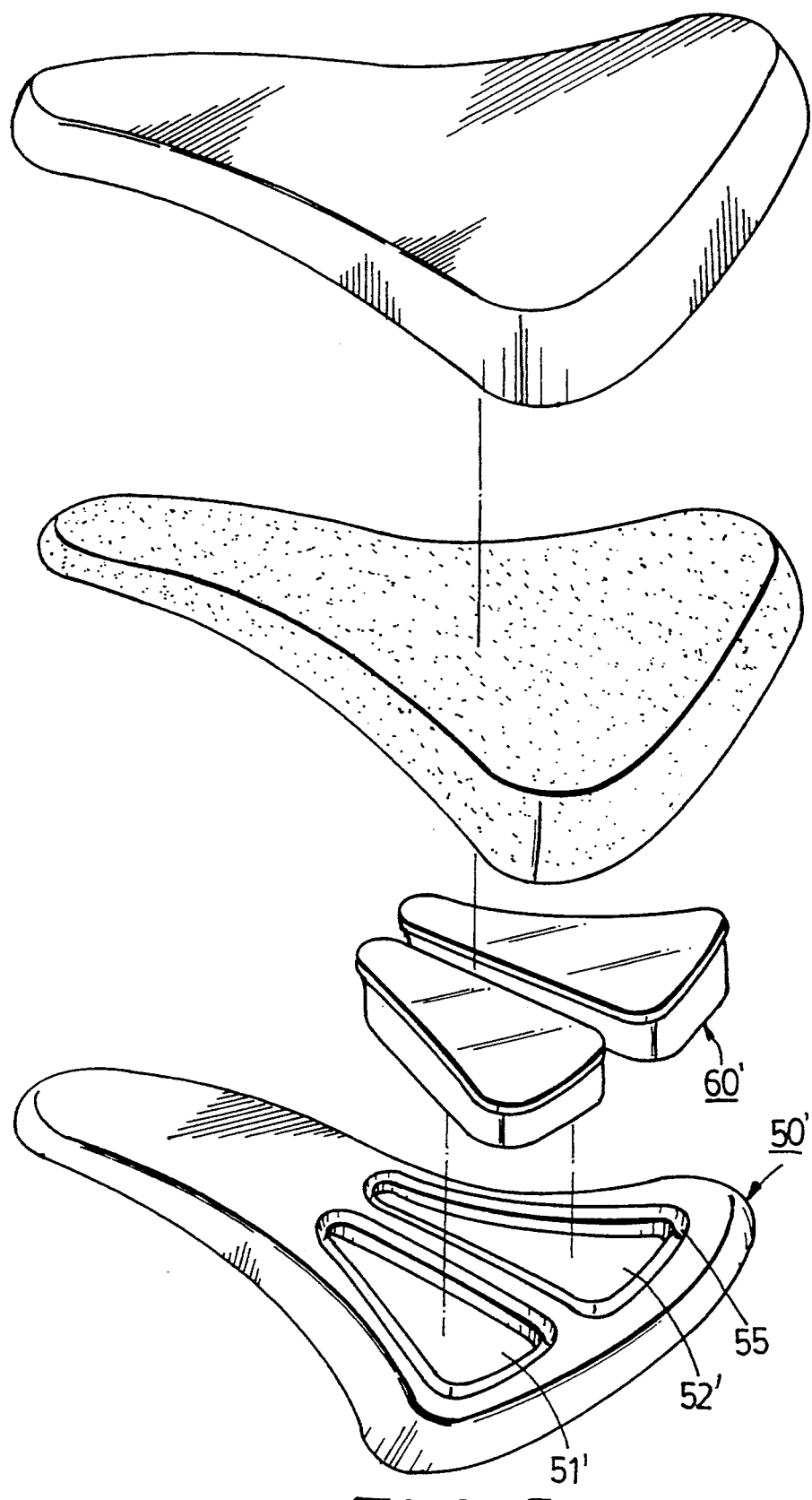
FIG. 5 is an exploded view showing the second embodiment of the saddle according to this invention.

Referring to FIG. 5, the saddle body (50') of the second preferred embodiment has two retaining units. Each of the retaining units includes an annular groove (55) formed in the saddle body (50') around a corresponding accommodating hole (52'). Each of the elastic bodies (60') has an upper end portion with a flange (61') (see FIG. 6) projecting outward from the periphery thereof so as to extend over the upper surface of the saddle body (50'), and an annular fastening portion (62') (see FIG. 6) extending downward from the flange (61') to fit in the annular groove (55) of the saddle body (50'), thereby retaining the elastic bodies (60') on the saddle body (50').

Figure 7:
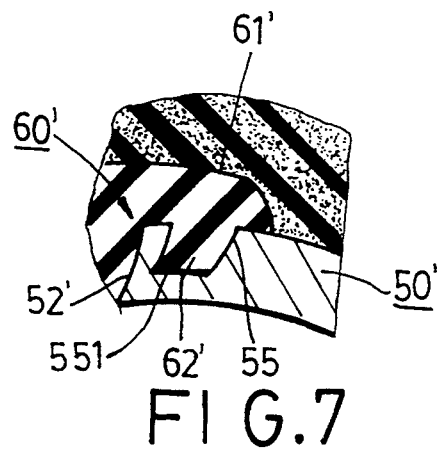
FIG. 7 is an schematic view illustrating the connection between the saddle body and one of the elastic bodies of the second embodiment according to this invention.

Referring to FIG. 7, each of the annular grooves (55) is defined by a bottom wall (551) and two inclined parallel side walls, thereby making it difficult to remove the annular fastening portion (62') of the elastic body (60') from the annular groove (55).

Figure 1:
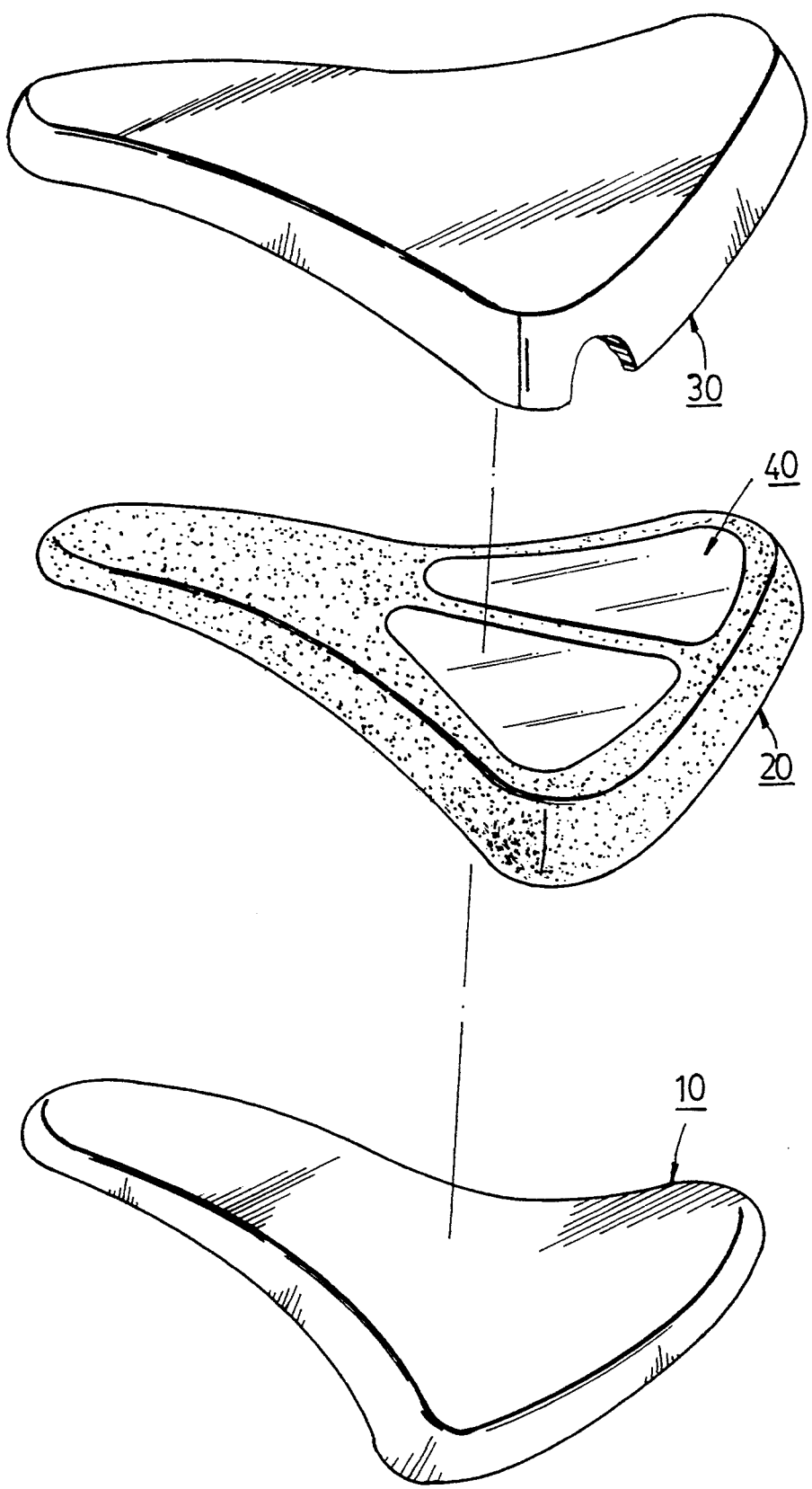
FIG. 1 is an exploded view of a conventional saddle.
Figure 2:
FIG. 2 is a schematic assembled view of the conventional saddle illustrating the depression of the elastic bodies when a user sits on the saddle.
Figure 4:
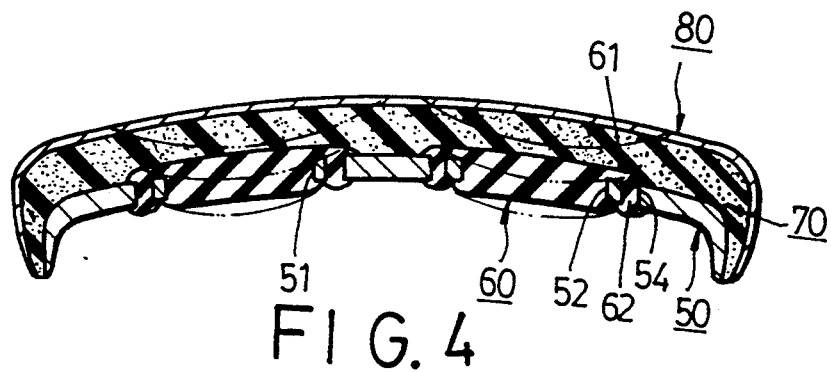
FIG. 4 is a schematic assembled view of the first embodiment illustrating the depression of the elastic bodies and the foam when a user sits on the saddle of this invention.
Figure 6:
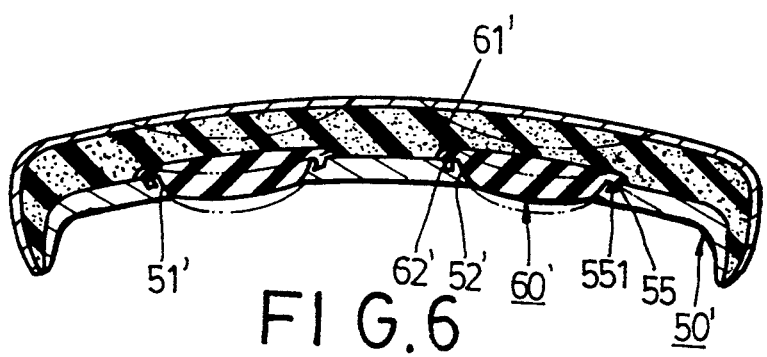
FIG. 6 is a schematic assembled view of the second embodiment illustrating the depression of the elastic bodies and the foam when a user sits on the saddle of this invention.

Referring to FIGS. 4 and 6, as a user sits on the saddle, the elastic bodies and the foam are depressed to form concave upper surfaces (shown in phantom lines). Because the elastic bodies are retained within the accommodating holes respectively, the elastic bodies can absorb effectively the shock of two portions of the foam, which two portions are located above the elastic bodies.

With this invention thus explained, it is apparent that numerous modifications and variations can be made without departing from the scope and spirit of this invention. It is therefore intended that this invention be limited only as indicated in the appended claims.

I claim:

1. A saddle for a bicycle, comprising:
   a saddle body made of a hard elastic material;
   a foam material adjacent said saddle body; and
   a covering adjacent said foam material, wherein:

said saddle body defining two accommodating holes therein, said accommodating holes being located at two positions in said saddle body under a portioin of said covering on which a user normally sits; and two elastic bodies, made of a soft elastic material, being respectively retained within said accommodating holes, said elastic bodies having top ends that extend from said accommodating holes;

said saddle body having two retaining units for retaining said elastic bodies on said saddle body, each of said retaining units including several fastening holes defined through said saddle body around a corresponding accommodating hole, each of said elastic bodies having an upper end portion with a flange projecting outward from a periphery thereof and extending over an upper surface of said saddle body, and several fastening strips extending downward from said flange and through said fastening holes respectively;

whereby said elastic bodies can absorb shock of two portions of said foam material located above said elastic bodies.

2. A saddle for a bicycle, comprising:

a saddle body made of a hard elastic material;

a foam material adjacent said saddle body; and a covering adjacent said foam material, wherein:

said saddle body defining two accommodating holes therein, said accommodating holes being located at two positions in said saddle body under a portion of said covering on which a user normally sits; and two elastic bodies, made of a soft elastic material, being respectively retained within said accommodating holes, said elastic bodies having top ends that extend from said accommodating holes;

said saddle body having two retaining units for retaining said elastic bodies on said saddle body, each of said retaining units including an annular groove defined in said saddle body around a corresponding accommodating hole, each of said elastic bodies havig an upper end portion with a flange projecting outward from a periphery thereof and extending over an upper surface of said saddle body, and an annular fastening portion extending downward from said flange to fit in said annular groove of said saddle body;

whereby said elastic bodies can absorb shock of two portions of said foam material located above said elastic bodies.

3. A saddle for a bicycle as claimed in claim 2, wherein said annular groove is defined by a bottom wall and two inclined parallel side walls.

* * * * *